United States Patent
Ishido

(10) Patent No.: US 8,610,978 B2
(45) Date of Patent: Dec. 17, 2013

(54) DOCUMENT READING APPARATUS

(75) Inventor: Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 12/695,979

(22) Filed: Jan. 28, 2010

(65) Prior Publication Data

US 2010/0195171 A1 Aug. 5, 2010

(30) Foreign Application Priority Data

Jan. 30, 2009 (JP) ................................ 2009-020238

(51) Int. Cl.
| | | |
|---|---|---|
| H04N 1/46 | (2006.01) | |
| H04N 1/04 | (2006.01) | |
| H04N 1/40 | (2006.01) | |
| H04N 1/60 | (2006.01) | |
| H01L 31/0232 | (2006.01) | |
| G06K 7/12 | (2006.01) | |
| G03G 15/01 | (2006.01) | |
| F21V 9/00 | (2006.01) | |
| H01J 1/62 | (2006.01) | |
| G02F 1/1335 | (2006.01) | |
| G03B 21/56 | (2006.01) | |
| G03B 21/60 | (2006.01) | |

(52) U.S. Cl.
USPC ............ 358/509; 358/475; 358/514; 358/1.9; 358/474; 358/445; 358/512; 257/432; 235/469; 399/39; 362/231; 313/504; 349/62; 359/454; 359/443

(58) Field of Classification Search
USPC .................. 358/509, 475, 514, 1.9, 505, 474; 362/231; 313/504; 359/454, 443; 349/62; 257/432
See application file for complete search history.

(56) References Cited

U.S. PATENT DOCUMENTS

| | | | |
|---|---|---|---|
| 6,765,703 B1 | 7/2004 | Watanabe | |
| 7,510,300 B2 | 3/2009 | Iwauchi | |
| 7,518,763 B2 | 4/2009 | Shiraishi | |
| 2005/0162712 A1* | 7/2005 | Shiraishi et al. | 358/474 |
| 2008/0157244 A1* | 7/2008 | Yun et al. | 257/432 |
| 2010/0103346 A1* | 4/2010 | Ajichi et al. | 349/62 |

FOREIGN PATENT DOCUMENTS

| | | |
|---|---|---|
| JP | 2000-49374 | 2/2000 |
| JP | 2002-111968 | 4/2002 |
| JP | 2005-210450 A | 8/2005 |
| JP | 2005-236530 | 9/2005 |
| JP | 2005-302737 A | 10/2005 |
| JP | 2008-35561 | 2/2008 |

* cited by examiner

Primary Examiner — Charlotte M Baker
Assistant Examiner — Rury Grisham
(74) Attorney, Agent, or Firm — Canon USA Inc. IP Division

(57) ABSTRACT

A document reading apparatus includes a white LED including an LED and a fluorescent material and configured to illuminate a document reading position with light, a reading unit having a color line sensor and a monochrome line sensor and configured to read an image of a document illuminated with the light emitted from the white LED, and a filter arranged on an optical path between the monochrome line sensor and the document, and wherein the filter is configured to suppress transmission of light at a peak wavelength of the LED so that, regarding an intensity of light to be received on the monochrome line sensor, the intensity of the light at the peak wavelength of the LED is smaller than the intensity of the light at the peak wavelength of the fluorescent material when the light emitted from the LED is received.

32 Claims, 25 Drawing Sheets

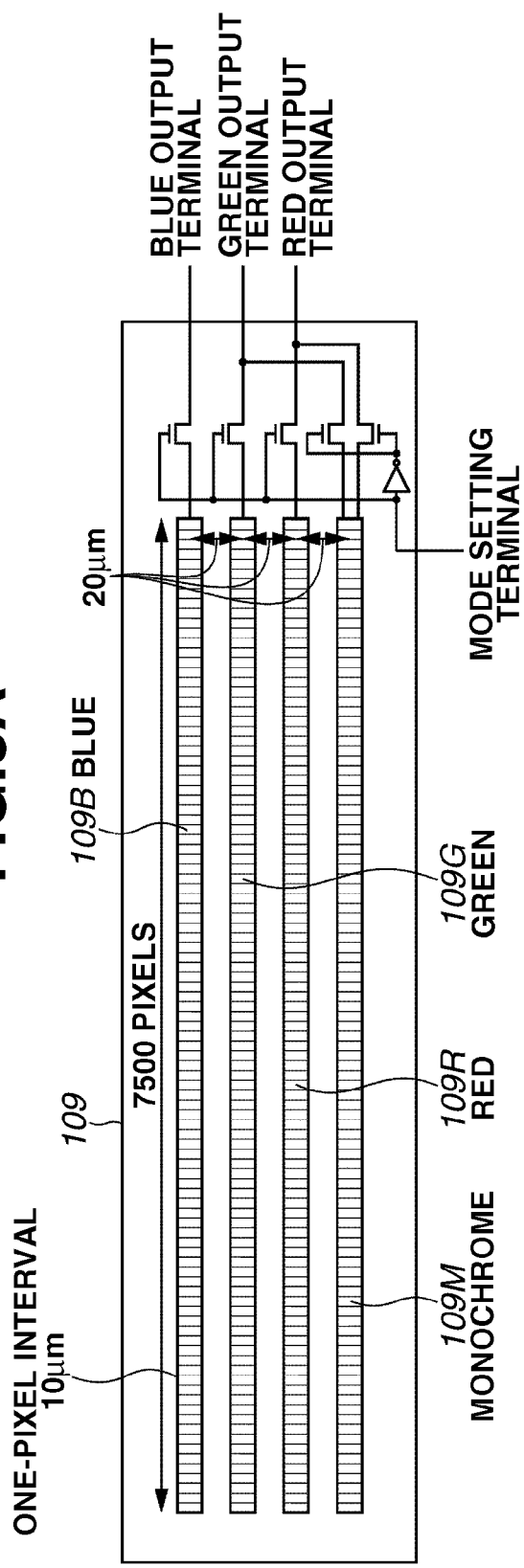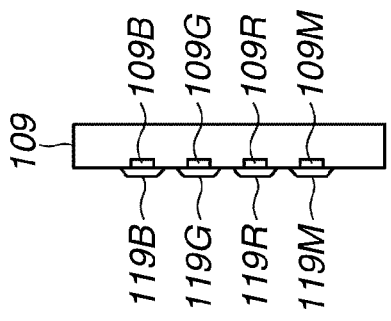

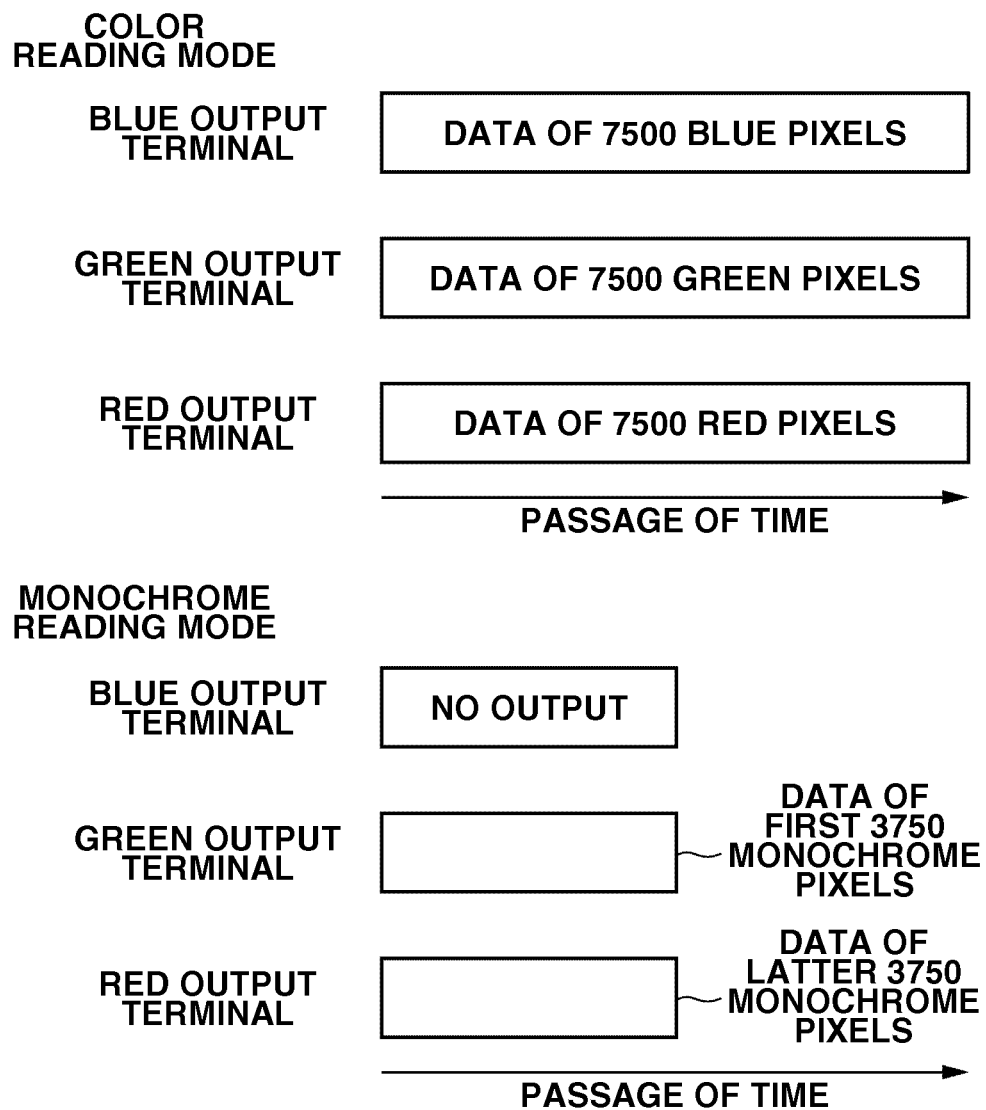

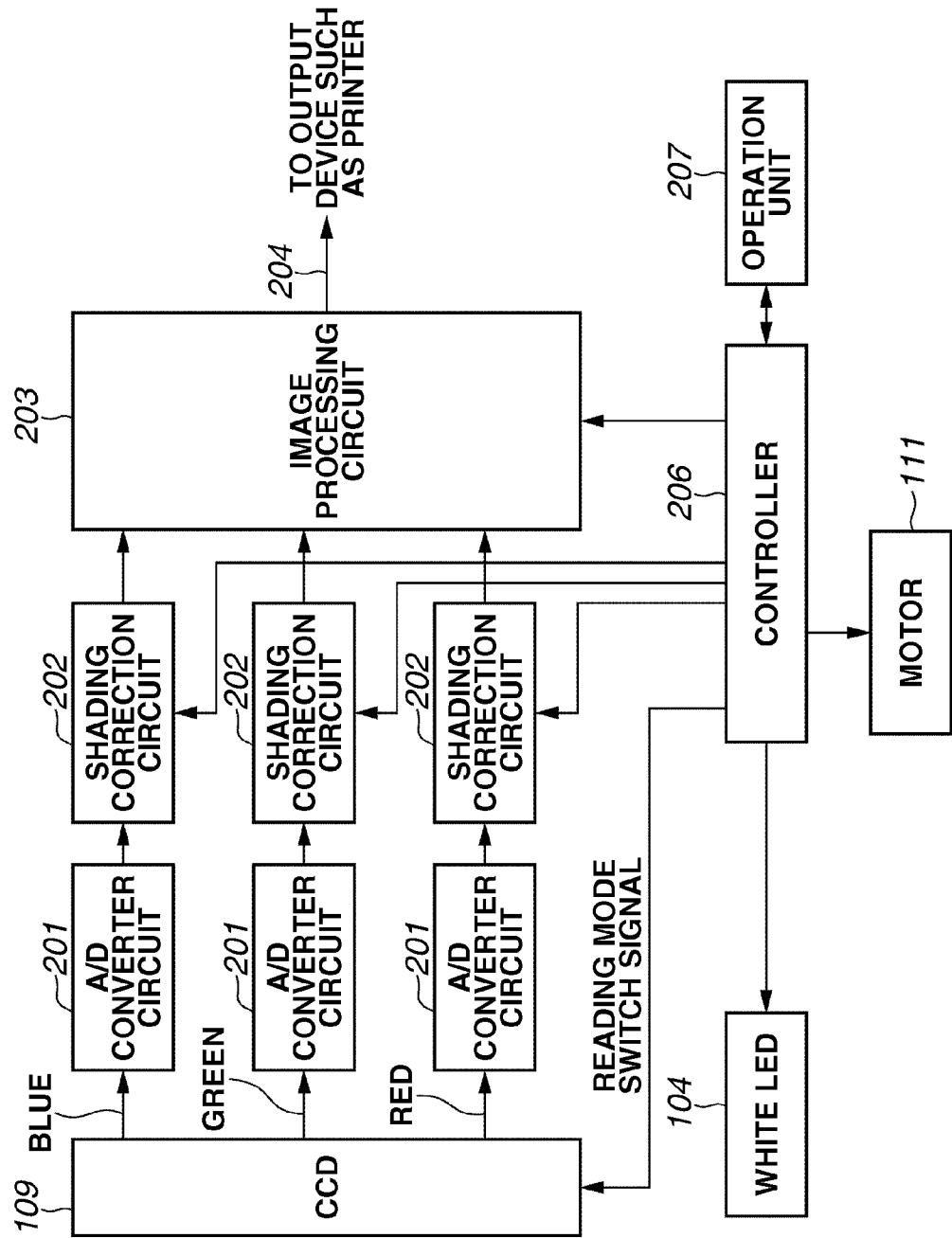

US 8,610,978 B2

DOCUMENT READING APPARATUS

BACKGROUND OF THE INVENTION

1. Field of the Invention

The present invention relates to a document reading apparatus having a white light-emitting diode (LED) as a light source.

2. Description of the Related Art

Recently, it has been discussed to include a color image sensor and a monochrome image sensor in a document reading apparatus used in a copying machine in Japanese Patent Application Laid-Open Nos. 2002-111968 and 2008-35561.

Japanese Patent Application Laid-Open No. 2002-111968 discusses a technique in which a document image is read quickly during a monochrome mode, by reading the image with R, G, and B sensors during a color mode and reading the document image with a monochrome sensor during the monochrome mode.

Japanese Patent Application Laid-Open No. 2008-35561 discusses a technique in which the document image is read by a light-receiving element array that includes an optical filter during a first copying mode and read by a light-receiving element array which does not include an optical filter during a second copying mode.

Further, recently, to reduce power consumption, it has been proposed to use a white LED as a light source for color reading in the document reading apparatus (e.g., see Japanese Patent Application Laid-Open No. 2005-236530). To reduce costs, there are some white LEDs that use a blue LED and a yellow light-emitting fluorescent material (phosphor) (e.g., see Japanese Patent Application Laid-Open No. 2000-49374).

However, if the white LED using a blue LED and a yellow light-emitting fluorescent material (phosphor) is used as the light source for a document reading apparatus that includes a color image sensor having an optical filter and a monochrome image sensor that does not have an optical filter, the following problems occur.

As illustrated in FIG. 2, the spectral characteristics for a white LED that includes a blue LED and a yellow light-emitting fluorescent material (phosphor) have a specific wavelength region (around 450 nm) in which the luminous intensity is higher than those for other wavelength regions. On the other hand, as illustrated in FIG. 11, the standard relative visibility characteristics (International Commission on Illumination (CIE) standards) for a person under a daylight light source D65 (JIS Standards (JIS-Z8720)) have a different peak wavelength region (around 555 nm) to the peak wavelength region of the white LED.

Therefore, the monochrome image sensor that does not have an optical filter reads the document image in a color, which is different from the color that can be seen under normal daylight color. In practice, the monochrome image sensor reads the document image as luminance information. Therefore, the monochrome image sensor reads the document image with the luminance (density) for each color in the document image differently from when seen under normal daylight color. This can cause problems in the density reproducibility of the document image.

SUMMARY OF THE INVENTION

According to an aspect of the present invention, a document reading apparatus includes a white LED including an LED and a fluorescent material and configured to irradiate a document reading position with light, a reading unit having a color line sensor and a monochrome line sensor and configured to read an image of a document irradiated with the light emitted from the white LED, and a filter arranged on an optical path between the monochrome line sensor and the document, and wherein the filter is configured to suppress transmission of light at a peak wavelength of the LED so that, regarding an intensity of light to be received on the monochrome line sensor, the intensity of the light at the peak wavelength of the LED is smaller than the intensity of the light at the peak wavelength of the fluorescent material when the light emitted from the LED is received.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate a configuration of a charge-coupled device (CCD).

FIG. 4 illustrates a state of data output from each output terminal of the CCD in respective reading modes.

FIG. 5 is a block diagram illustrating a configuration of a document reading apparatus.

DESCRIPTION OF THE EMBODIMENTS

Various exemplary embodiments, features, and aspects of the invention will be described in detail below with reference to the drawings.

Figure 1:
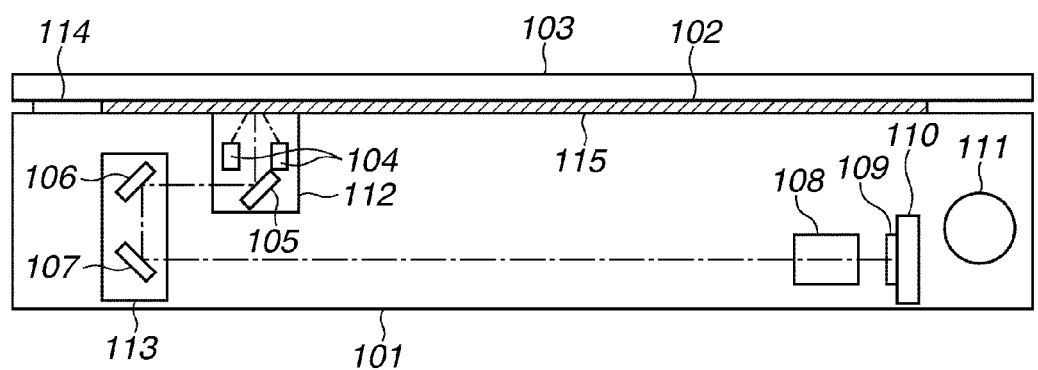
FIG. 1 illustrates a configuration of a document reading apparatus according to an exemplary embodiment of the present invention.

FIG. 1 illustrates a schematic configuration of a document reading apparatus 101 according to an exemplary embodiment of the present invention. A white LED 104 irradiates a platen glass 115 (document reading position) with light. The white LED 104 emits white light using a blue LED and a yellow light-emitting fluorescent material (phosphor). As the blue LED, a gallium nitride (GaN) LED may be used. As the yellow light-emitting fluorescent material (phosphor), an yttrium aluminum garnet (YAG) fluorescent material (phosphor) may be used.

Figure 2:
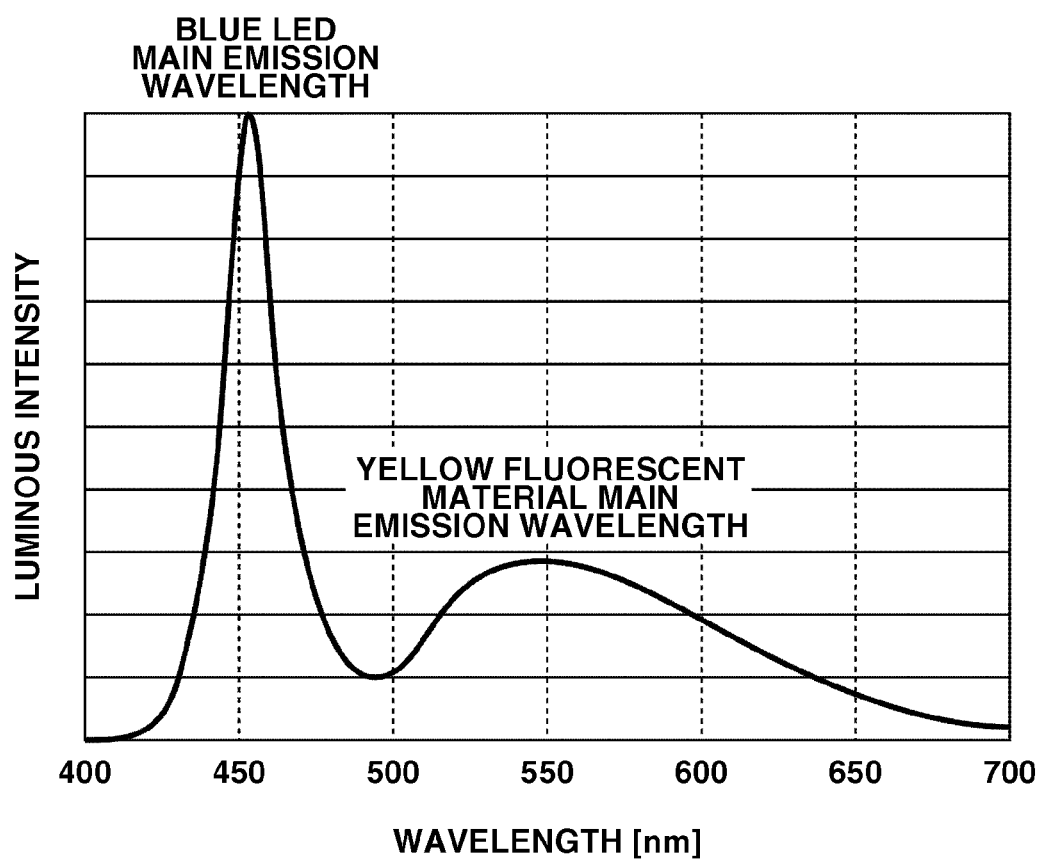
FIG. 2 illustrates a spectral characteristic of a white LED including a blue LED and a yellow light-emitting fluorescent material (phosphor).

FIG. 2 illustrates spectral characteristics of the white LED 104. A document 102 placed on the platen glass 115 (document reading position) is pressed by a platen cover 103. Light is irradiated on the document 102 from the white LED 104. Reflected light from the document 102 is guided to a CCD 109 via mirrors 105, 106, and 107, and a lens 108. The mirror 105 and the white LED 104 are supported by an optical carriage 112. The mirrors 106 and 107 are supported by an optical carriage 113.

The optical carriages 112 and 113 can scan the document 102 by being moved by a motor 111 along the document. Although not illustrated in the drawings, the document may also be scanned in a state where the optical carriages 112 and 113 are stopped at a predetermined position, by moving the document so as to pass by the predetermined position.

The CCD 109 is a 4-line CCD having line sensors 109R, 109G, 109B, and 109M respectively for red (R), green (G), blue (B), and monochrome (M). The line sensors 109R, 109G, 109B, and 109M are respectively coated with a color filter 119R, 119G, 119B, and 119M. The color filters 119R, 119G, and 119B are respectively red, green, and blue color filters.

The color filter 119M coated on the monochrome line sensor 109M will be described in detail below. Each line sensor reads the document image by photoelectrically converting the reflected light from the document. The line sensors 109R, 109G, and 109B constitute a color reading unit for color images. The monochrome line sensor 109M constitutes a monochrome reading unit for monochrome images.

The CCD 109 is provided on a substrate 110. A standard white plate 114 is read by the CCD 109 with light irradiated by the white LED 104 when measuring unevenness in a main scanning direction (line sensor longitudinal direction) in the amount of lit light of the white LED 104, and unevenness in the sensitivity of the CCD 109. The length of the main scanning direction of the white LED 104 is the length covering the total area of the main scanning area.

FIG. 3A illustrates a configuration of the CCD 109. FIG. 3B is a side view of the CCD 109. The R, G, B, and monochrome line sensors each have a 7,500-pixel image sensor in the main scanning direction. The interval between pixels is 10 μm. These R, G, B, and monochrome line sensors are arranged in a 20 μm interval in the sub-scanning direction. The size of one pixel in the image sensor is 10×10 μm.

The CCD 109 performs reading using the R, G, and B line sensors during a color reading mode, and using the monochrome line sensor during a monochrome reading mode. When reading using the monochrome line sensor, the document image is read based on a grayscale.

The CCD 109 has three output terminals, red, green, and blue. When a signal indicating the color reading mode is input into a mode setting terminal, gates are switched so that data of 7,500 pixels of the respective R, G, and B lines sensors is output from the three red, green, and blue output terminals.

When a signal indicating the monochrome reading mode is input into the mode setting terminal, the gates are switched so that the first 3,750 pixels of the 7,500 pixels of the monochrome line sensor are output from the red output terminal, and the latter 3,750 pixels are output from the green terminal. Therefore, during the monochrome reading mode, the document can be read at twice the speed of the color reading mode.

FIG. 4 illustrates a state (format) of data output from each output terminal of the CCD 109 in respective reading modes.

FIG. 5 illustrates a configuration of a document reading apparatus according to the present exemplary embodiment. An analog/digital (A/D) converter circuit 201 converts analog image data read by the CCD 109 into digital image data. A shading correction circuit 202 performs shading correction on the read image data, which has been converted into digital image data by the A/D converter circuit 201.

To perform the shading correction, unevenness in the amount of light in the main scanning direction of the white LED 104 and unevenness in the sensitivity in the main scanning direction of the CCD 109 are detected beforehand using the standard white plate 114. Then, using the read results of the standard white plate 114, a gain correction and an offset correction are performed for each pixel of the CCD 109 so that the reading characteristics become uniform across the main scanning area.

An image processing circuit 203 converts the image data, which has undergone shading correction by the shading correction circuit 202, into a predetermined image data format. Then, the converted image data is transferred to an output device such as a printer via a data transfer line 204. During the monochrome reading mode, the image processing circuit 203 sorts the image data from the red, green, and blue output terminals of the CCD 109 into a one-line monochrome signal, and then transfers the sorted image data to the output device such as a printer via the data transfer line 204.

A controller 206 performs drive control of the CCD 109 and lighting control of the white LED 104. Further, the controller 206 receives user settings from an operation unit 207, such as the color reading mode and the monochrome reading mode.

Switching between the color reading mode and the monochrome reading mode is performed according to an instruction input from the user via the operation unit 207. The color reading mode is a mode for mainly reading a color document in color.

Although the monochrome reading mode is mainly used for reading a monochrome document, the monochrome reading mode can also be used when reading a color image as a monochrome image. In the monochrome reading mode, the document can be read at twice the speed of the color reading mode. In this case, the drive speed of the CCD 109 is the same as that during the color reading mode, with the scanning speed doubled in the sub-scanning direction.

Figure 6:
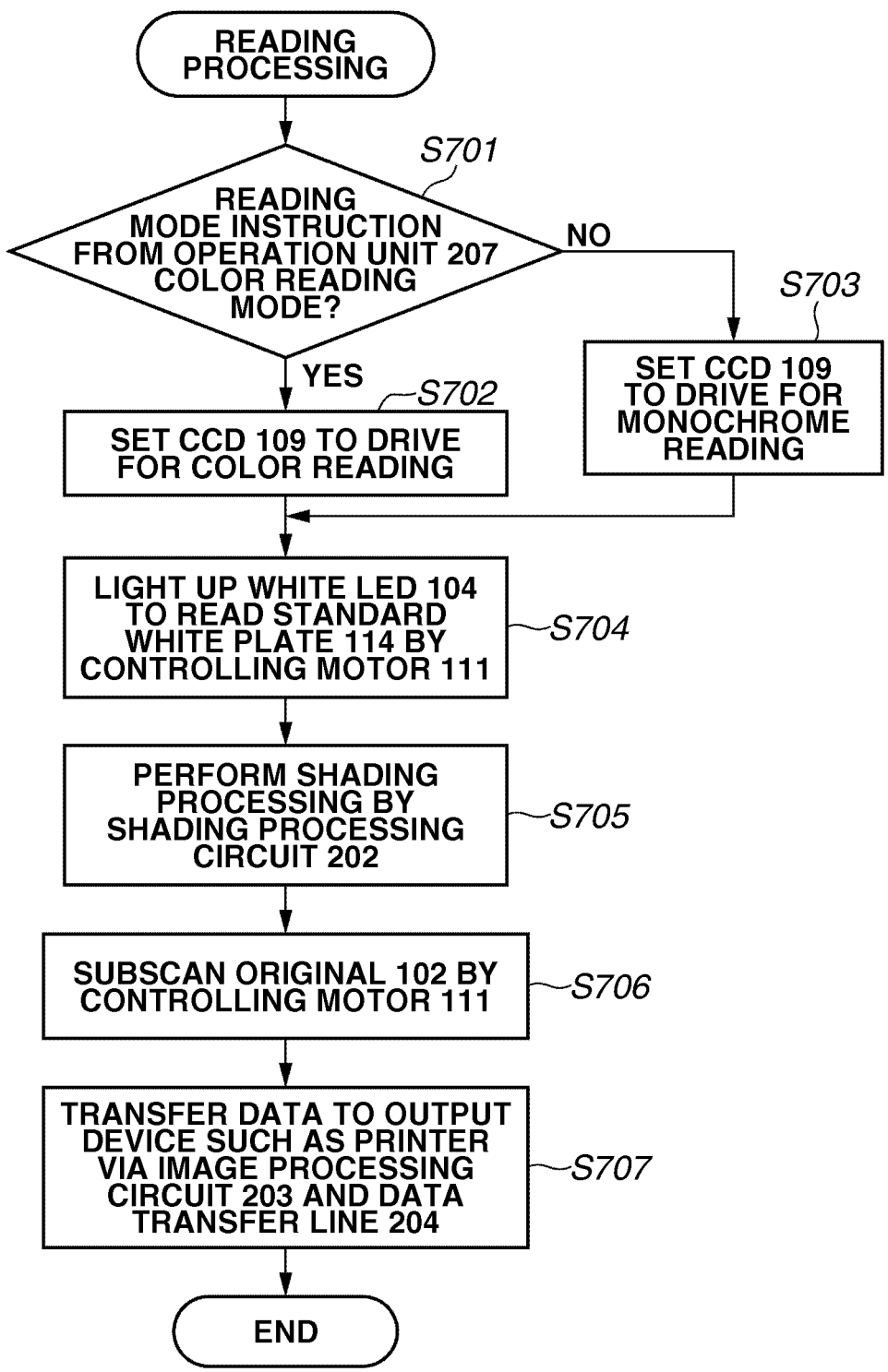
FIG. 6 is a control flowchart of reading processing executed by a controller.

FIG. 6 is a control flowchart of reading processing executed by the controller 206. In step S701, the controller 206 determines whether the color reading mode or the monochrome reading mode is selected and instructed from the operation unit 207. In steps S702 and S703, the controller 206 outputs a mode setting signal corresponding to the instructed reading mode (color reading mode or monochrome reading mode) to the mode setting terminal of the CCD 109, and drives the CCD 109.

Next, in step S704, the controller 206 moves the optical carriages 112 and 113 to a position for reading the standard white plate 114, lights up the white LED 104, and reads the standard white plate 114 with the CCD 109. Then, in step S705, based on the results of reading the standard white plate 114, the controller 206 performs shading correction processing to correct unevenness in the amount of light of the white LED 104 and unevenness in the sensitivity of the CCD 109.

Next, in step S706, the controller 206 reads the document 102 by driving the motor 111 at a rotation speed according to the selected mode to scan the document 102. Compared with the rotation speed of the motor 111 during the color reading mode, the motor is driven at twice the speed during the monochrome reading mode.

In step S707, the controller 206 transfers the image data to a printer or the like via the image processing circuit 203 and the data transfer line 204. Based on such control, the controller 206 reads the document 102 and transfers the document image data to the output device.

Next, spectral characteristics in the document reading apparatus of the present exemplary embodiment will be described below in detail. The reading spectral characteristics during the color reading mode are mainly determined by the spectral sensitivity of the CCD 109, the spectral transmittance characteristics of the color filters coated respectively on the R, G, and B line sensors of the CCD 109, and the spectral characteristics of the white LED 104.

Figure 7:
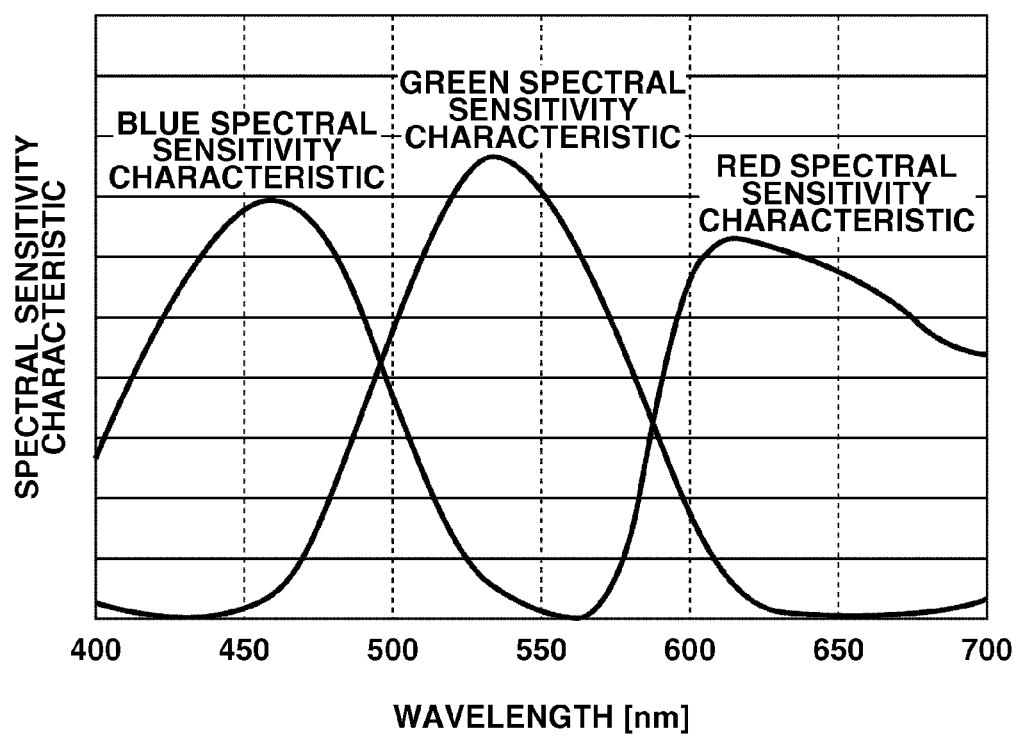
FIG. 7 is a graph illustrating a spectral sensitivity characteristic for each color line sensor of the CCD considering the spectral transmittance characteristic of the color filter.

FIG. 7 illustrates the spectral sensitivity characteristic for each color line sensor of the CCD 109 considering the spectral transmittance characteristic of a color filter. As described above, the spectral characteristics of the white LED 104 are as illustrated in FIG. 2.

Figure 8:
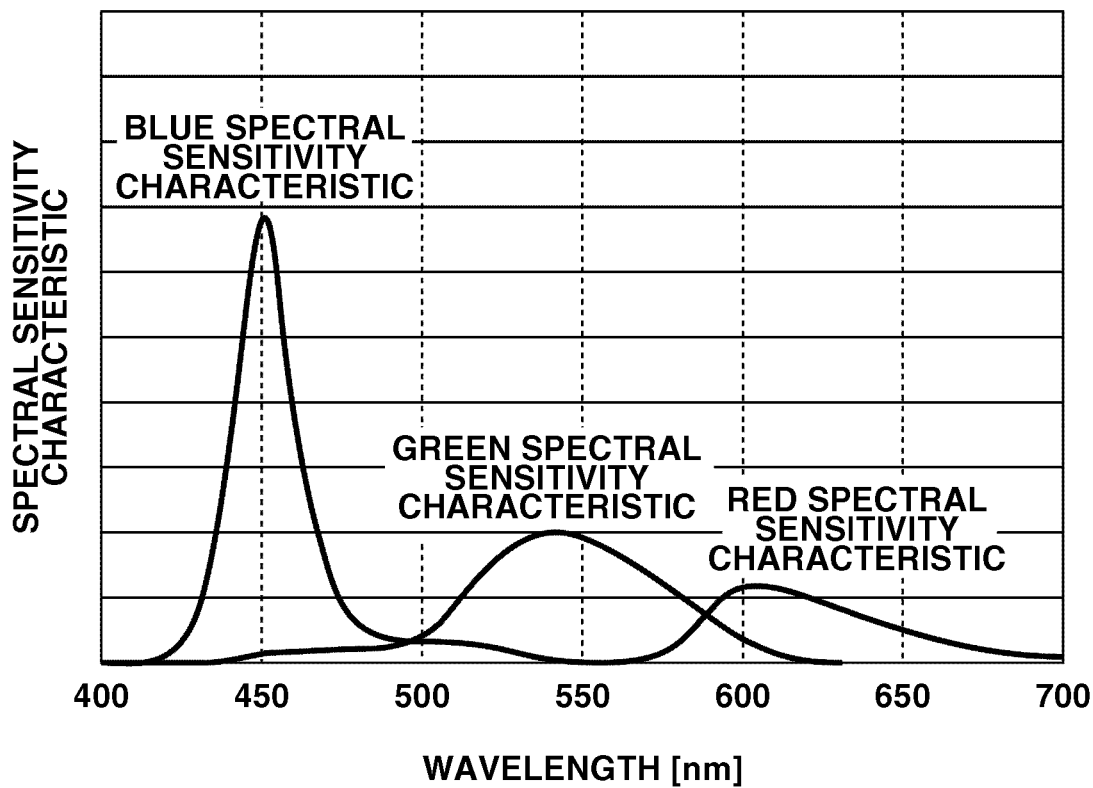
FIG. 8 is a graph illustrating the combined spectral characteristics of the spectral sensitivity characteristics of color line sensors and the spectral characteristics of the white LED.

FIG. 8 illustrates the combined spectral characteristics of the spectral sensitivity characteristics of color line sensors and the spectral characteristics of the white LED 104. During the color reading mode, the color document is read based on such spectral characteristics.

When a color filter is not coated on the monochrome line sensor of the CCD 109, the spectral characteristics during the monochrome reading mode are mainly determined based on the spectral sensitivity of the CCD 109 and the spectral characteristics of the white LED 104.

Figure 9:
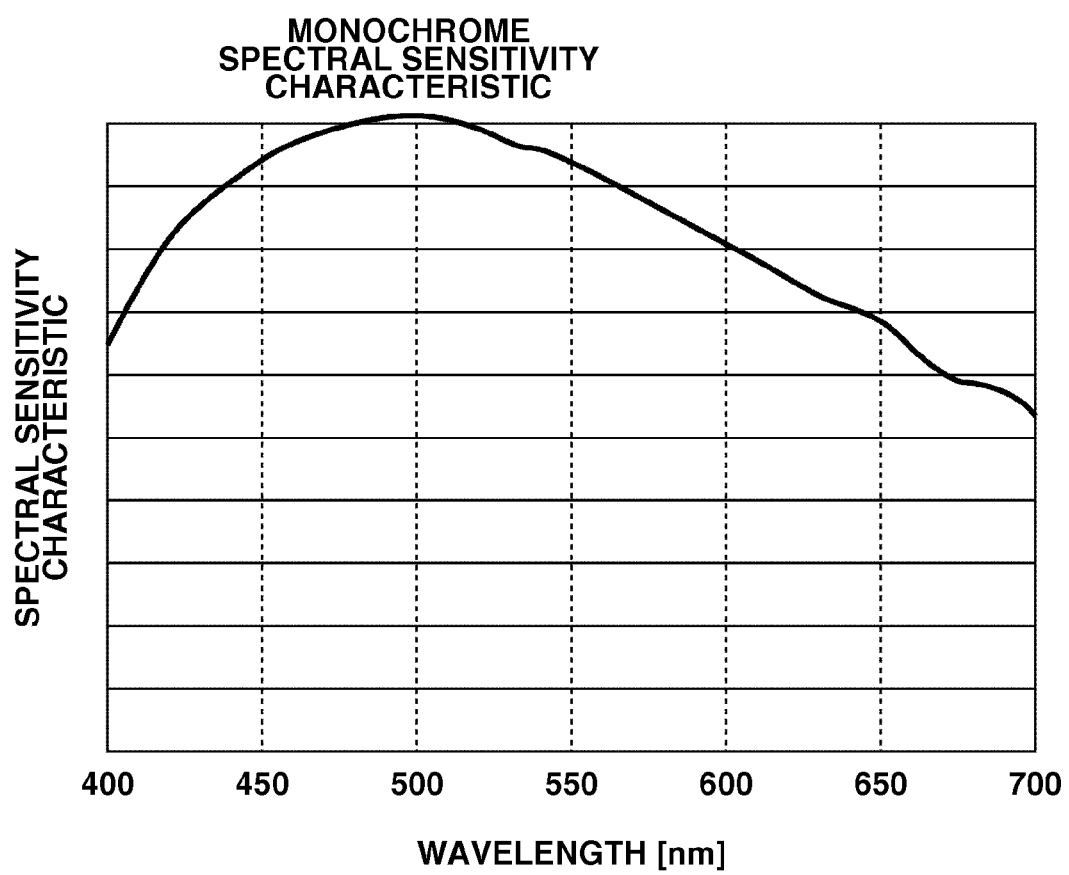
FIG. 9 is a graph illustrating the spectral sensitivity characteristic of the CCD when the color filter is not coated.
Figure 10:
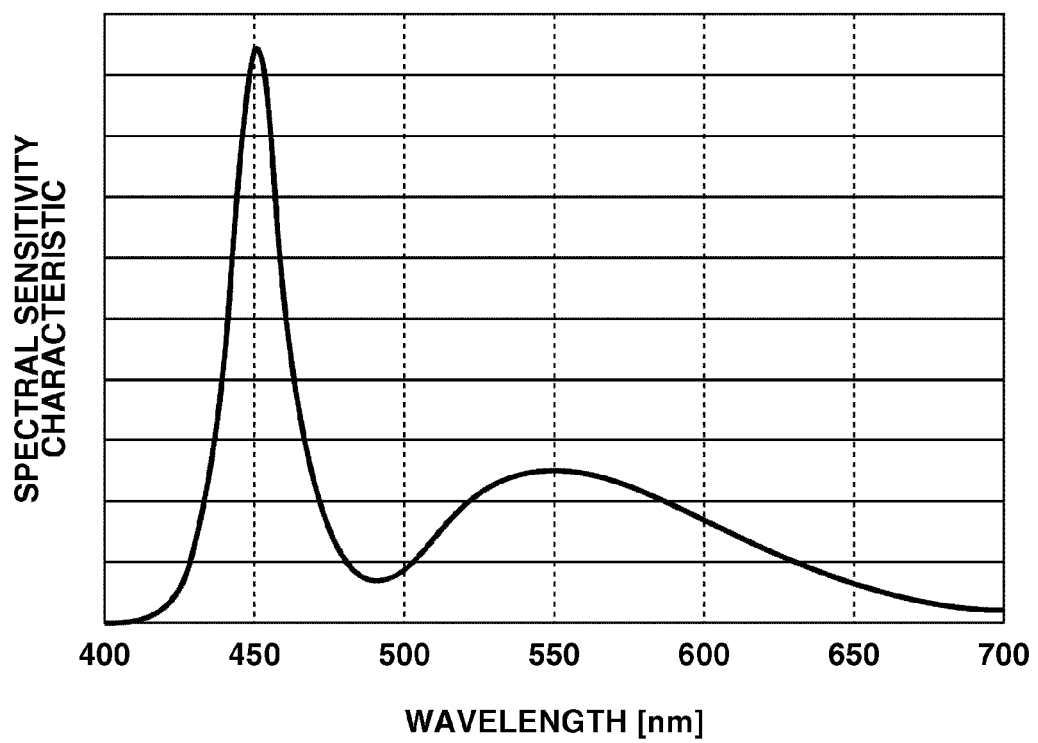
FIG. 10 is a graph illustrating the combined spectral characteristics of the spectral sensitivity characteristic of the CCD and the spectral characteristics of the white LED when the color filter is not coated.

The spectral characteristics will now be described for when a color filter is not coated on the CCD 109 to be used during the monochrome reading mode. FIG. 9 illustrates the spectral sensitivity characteristic of the monochrome line sensor of the CCD 109 when a color filter is not coated. FIG. 10 illustrates the combined spectral characteristics of the spectral sensitivity characteristic of the monochrome line sensor and the spectral characteristics of the white LED 104 when a color filter is not coated.

As illustrated in FIG. 10, when a color filter is not coated, the combined spectral characteristics of the spectral characteristics of the monochrome line sensor of the CCD 109 and the spectral characteristics of the white LED 104 have a spectral characteristics peak at an emission peak wavelength of the blue LED around 450 nm.

Figure 11:
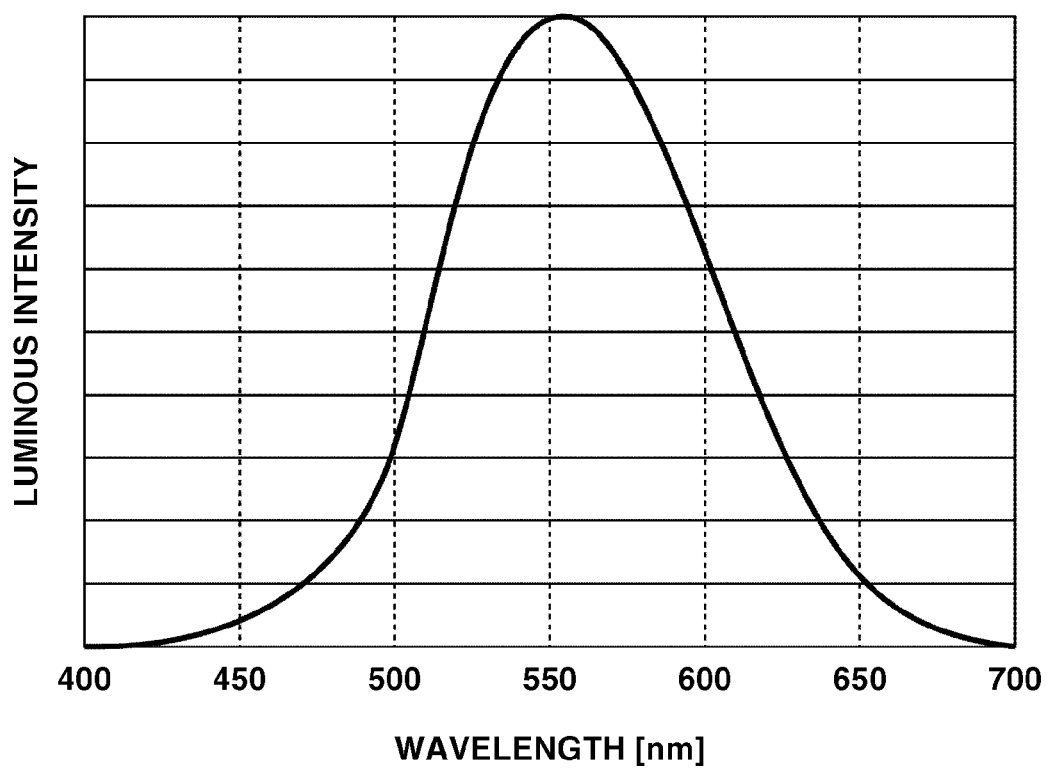
FIG. 11 is a graph illustrating standard relative visibility characteristics.
Figure 12:
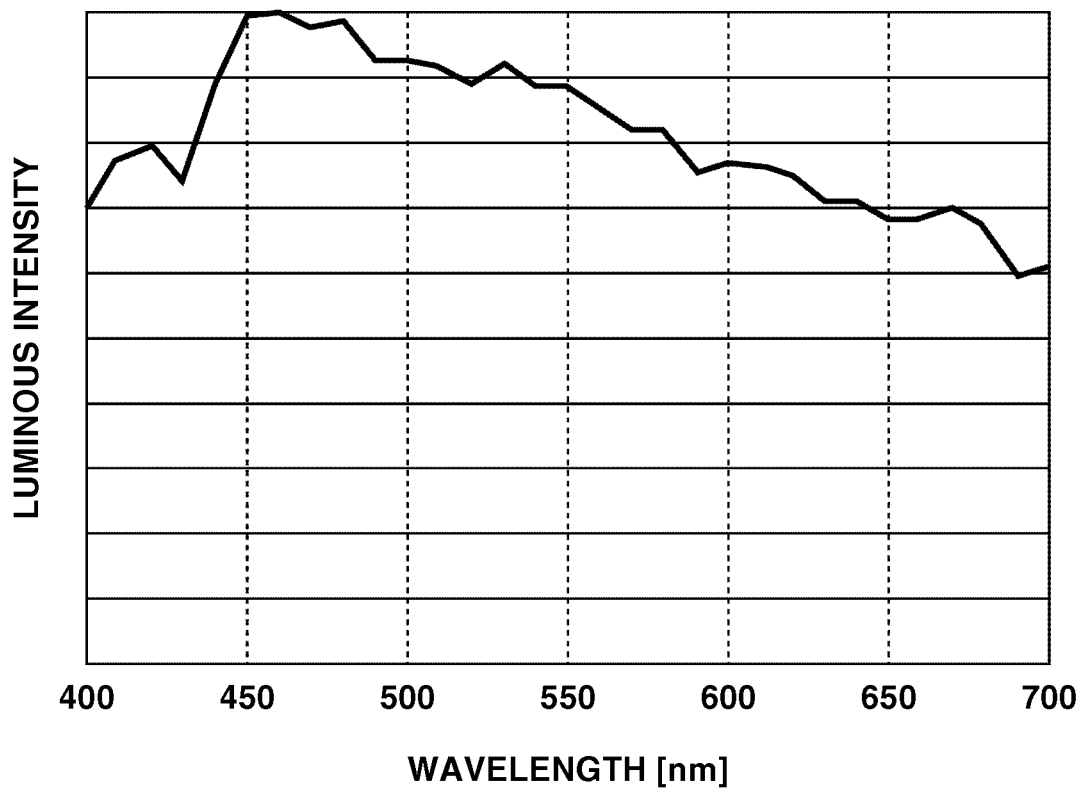
FIG. 12 is a graph illustrating the spectral characteristics of the standard light source.
Figure 13:
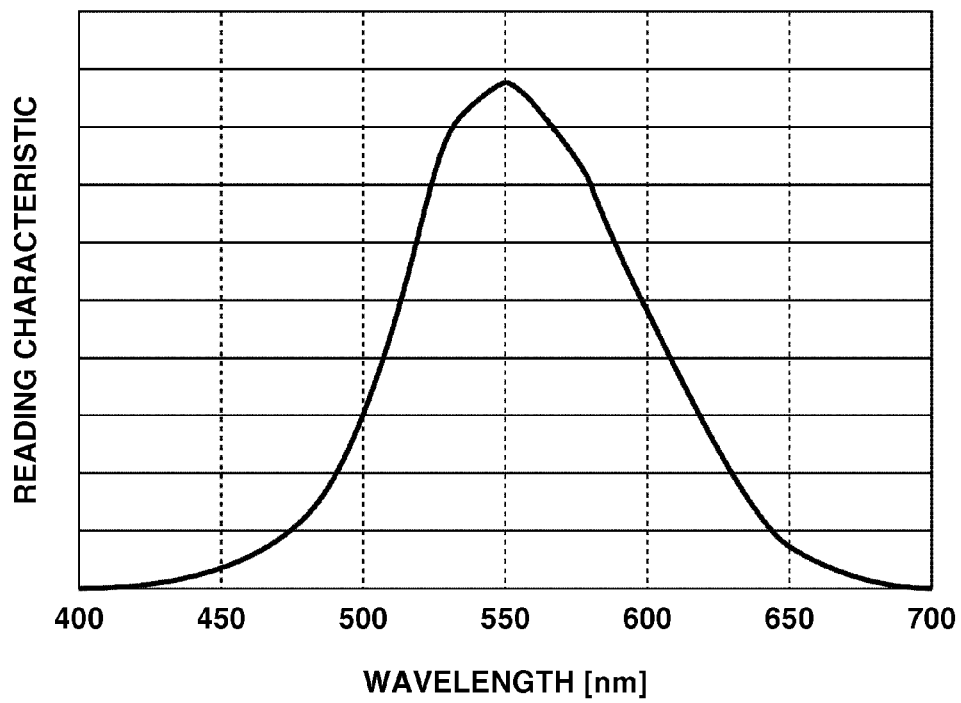
FIG. 13 is a graph illustrating the combined spectral characteristics of the standard light source and the standard relative visibility characteristics.

FIG. 11 illustrates visibility characteristics (standard relative visibility characteristics standardized by the CIE). FIG. 12 illustrates the spectral characteristics of a D65 light source defined by the JIS standards as standard daylight color. FIG. 13 illustrates the combined spectral characteristics of the visibility characteristics and the spectral characteristics of standard daylight color.

The combined spectral characteristics illustrated in FIG. 10 of the spectral characteristics of the monochrome line sensor of the CCD 109 and the spectral characteristics of the white LED 104 differ greatly from the combined spectral characteristics illustrated in FIG. 13 of the visibility characteristics and the spectral characteristics of standard daylight color. Therefore, when a yellow document having a spectral reflectance characteristic like that illustrated in FIG. 14 is read, the reading results can be very different from those viewed by a person.

This phenomenon can be explained based on analysis of differences in the spectral characteristics, which occur when each of a white document and a yellow document is read. When a white document as illustrated in FIG. 15 is read with the CCD 109 having the combined spectral characteristics when a color filter is not coated (FIG. 10), the reading spectral characteristics are as illustrated in FIG. 16.

Figure 14:
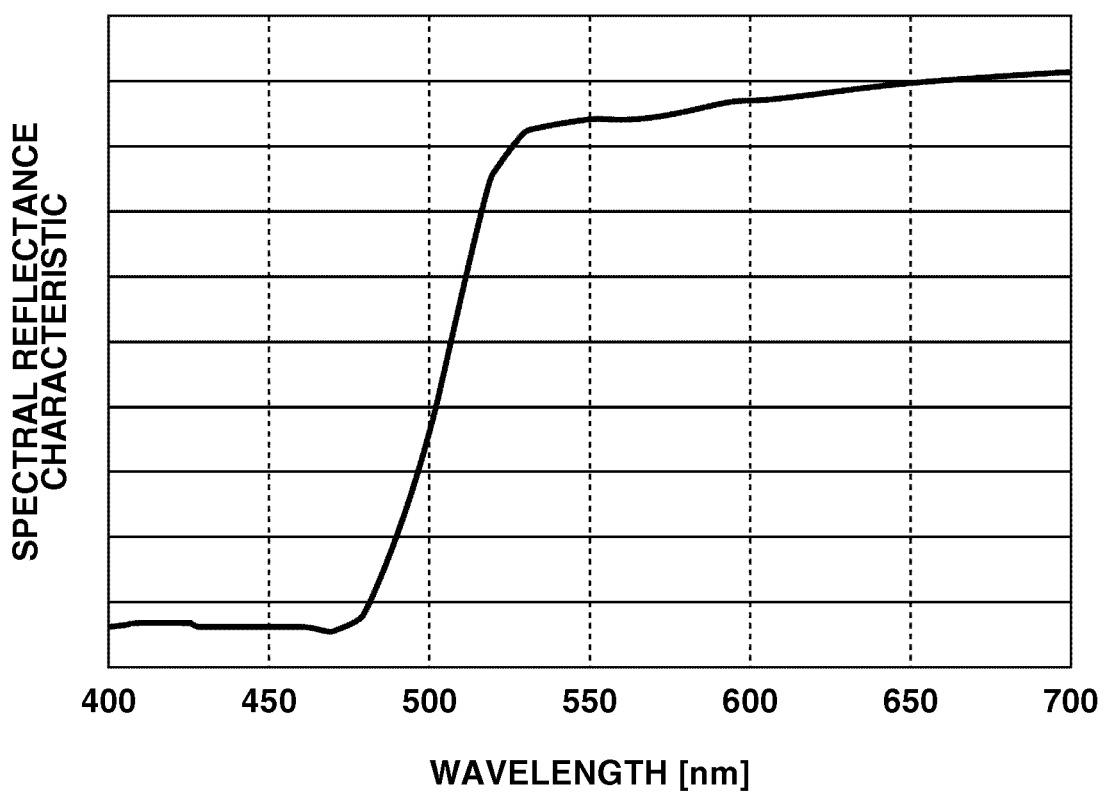
FIG. 14 is a graph illustrating the spectral reflectance characteristic of a yellow document.
Figure 16:
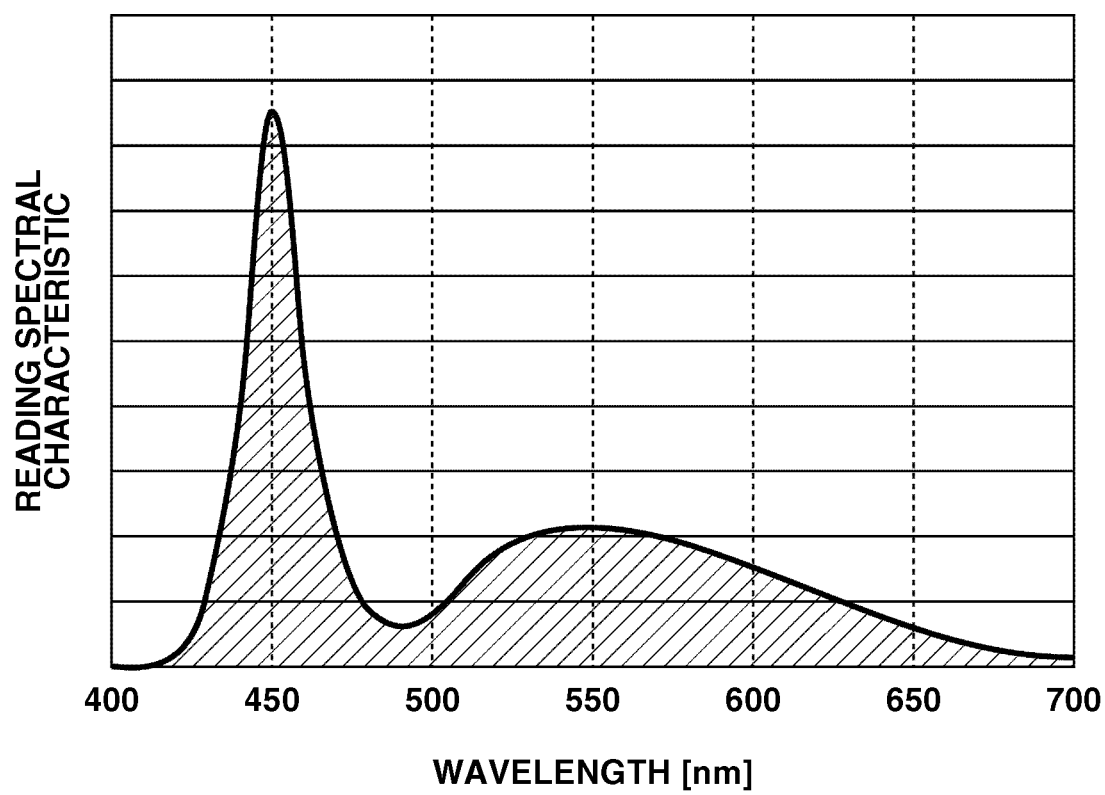
FIG. 16 is a graph illustrating the combined spectral characteristics when a white document is read by the CCD that is not coated with the color filter.
Figure 17:
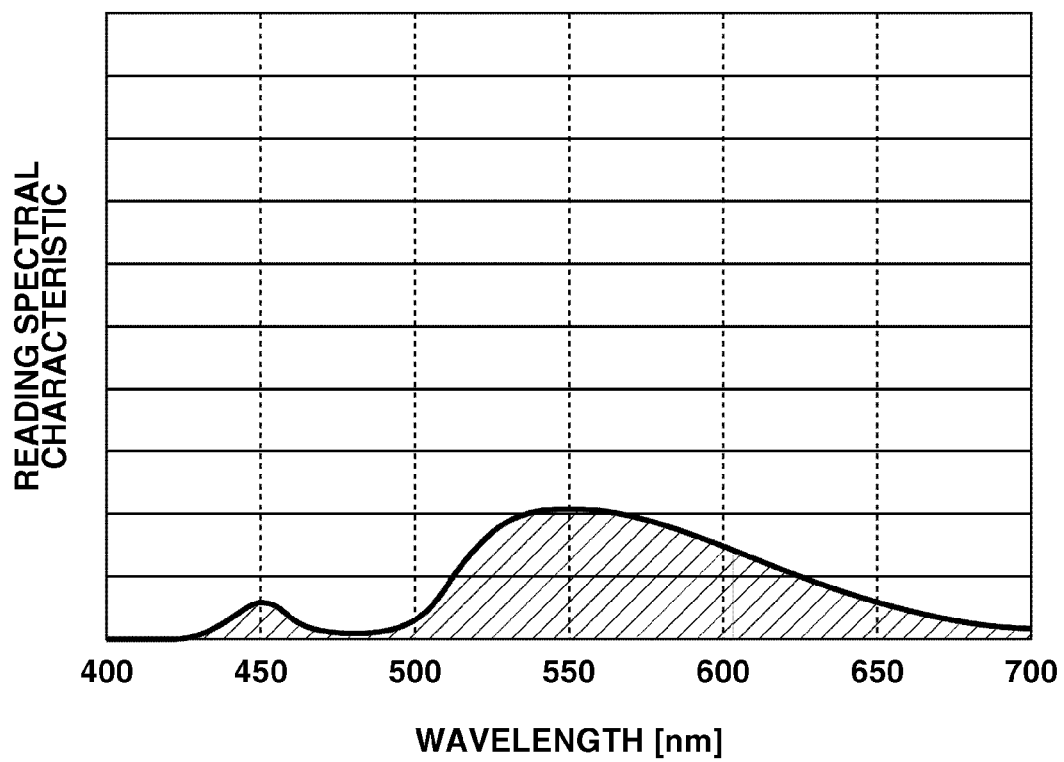
FIG. 17 is a graph illustrating the combined spectral characteristics when a yellow document is read by the CCD that is not coated with the color filter.

Further, when a yellow document as illustrated in FIG. 14 is read with the same combined spectral characteristics, the reading spectral characteristics areas illustrated in FIG. 17. If the surface area of the hatched portion in FIG. 16 is considered as 1, the surface area of the hatched portion in FIG. 17 is 0.5. This means that if white is read with an intensity of 1, yellow is read with an intensity of 0.5.

Figure 15:
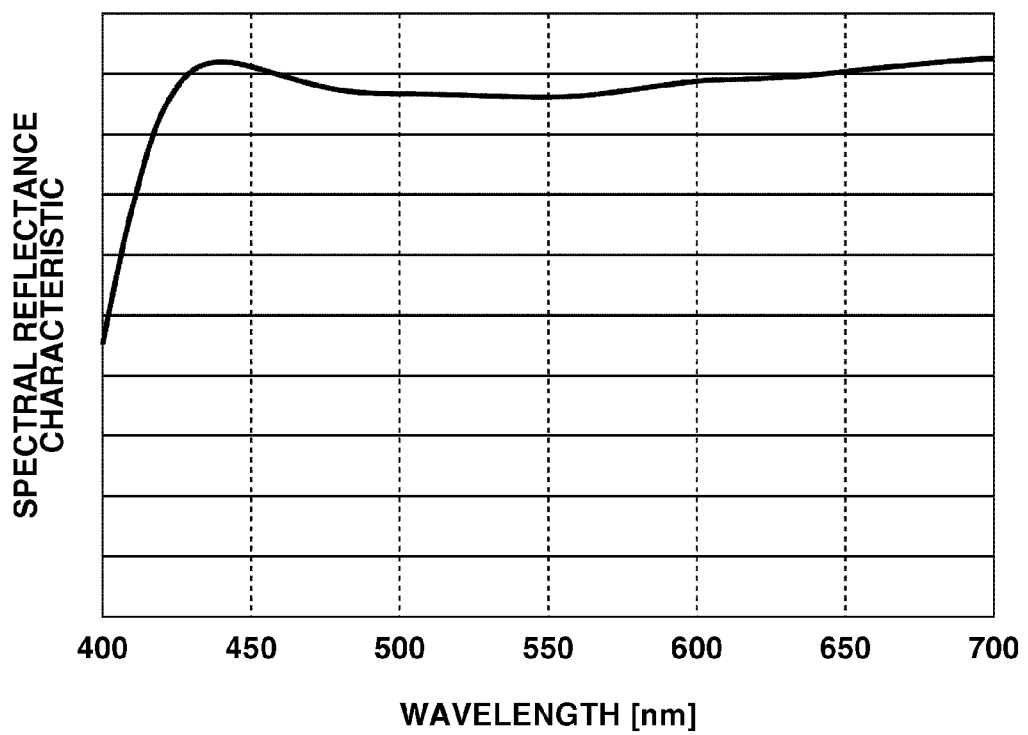
FIG. 15 is a graph illustrating the spectral reflectance characteristics of a white document.
Figure 18:
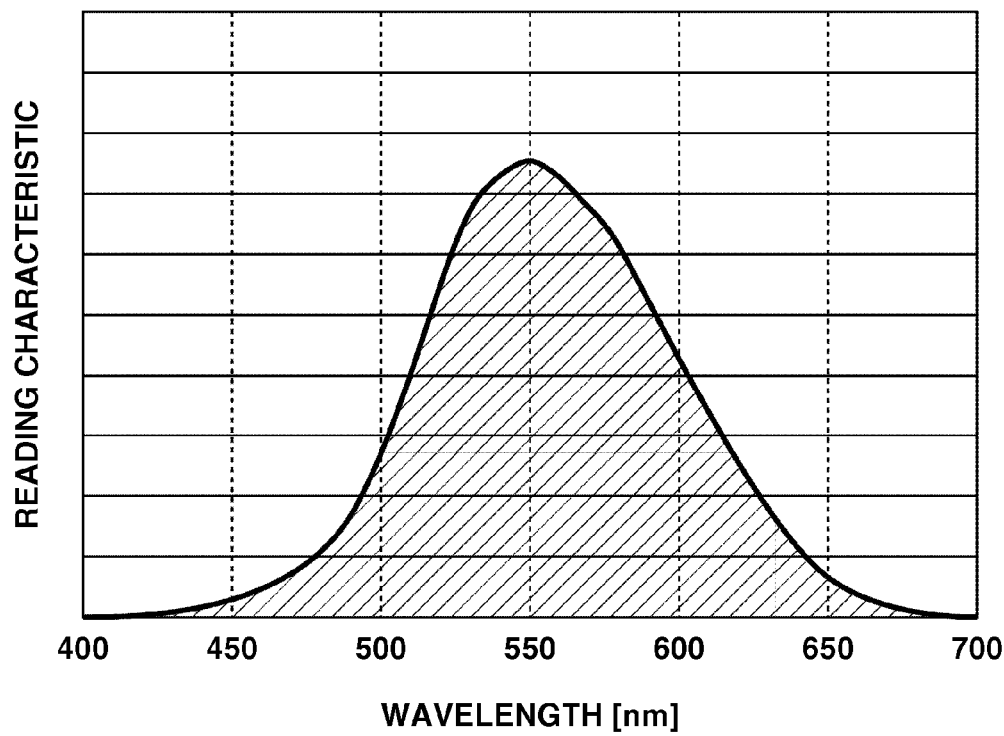
FIG. 18 is a graph illustrating the combined spectral characteristics when a white document is viewed with standard relative visibility under the standard light source.
Figure 19:
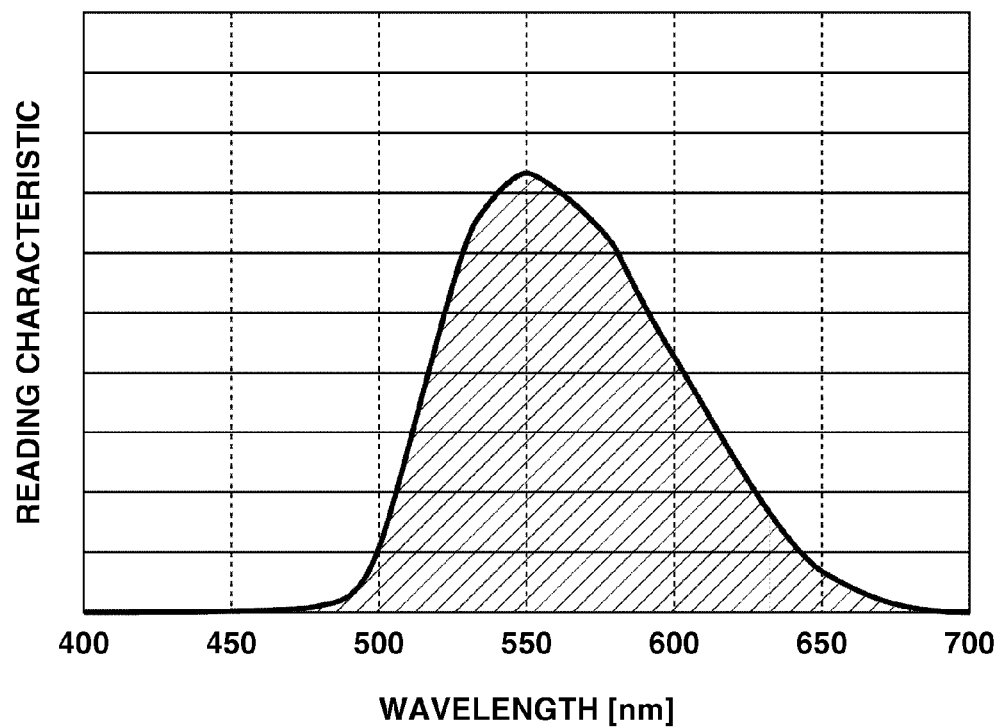
FIG. 19 is a graph illustrating the combined spectral characteristics when a yellow document is viewed with standard relative visibility under the standard light source.

In contrast, when a person views a white document as illustrated in FIG. 15 under the D65 light source, the spectral characteristics are as illustrated in FIG. 18. Further, when a person views a yellow document like that illustrated in FIG. 14 under the D65 light source, the spectral characteristics are as illustrated in FIG. 19. If the surface area of the hatched portion in FIG. 18 is considered as 1, the surface area of the hatched portion in FIG. 19 is approximately 0.87. This means that if white is viewed with an intensity of 1, yellow is viewed with an intensity of 0.87.

Thus, the yellow when a yellow document is viewed by a person under the D65 light source looks brighter than the yellow of a yellow document read by a monochrome line sensor that is not coated with a color filter. More specifically, the yellow of a yellow document read by a monochrome line sensor that is not coated with a color filter is read more densely than the yellow of a yellow document viewed by a person under the D65 light source. This can result in poor reproducibility.

Accordingly, the brightness (density) when a person views a document and the brightness (density) when a document is read by a monochrome line sensor that is not coated with a color filter are different. This can cause problems in density reproducibility.

Figure 20:
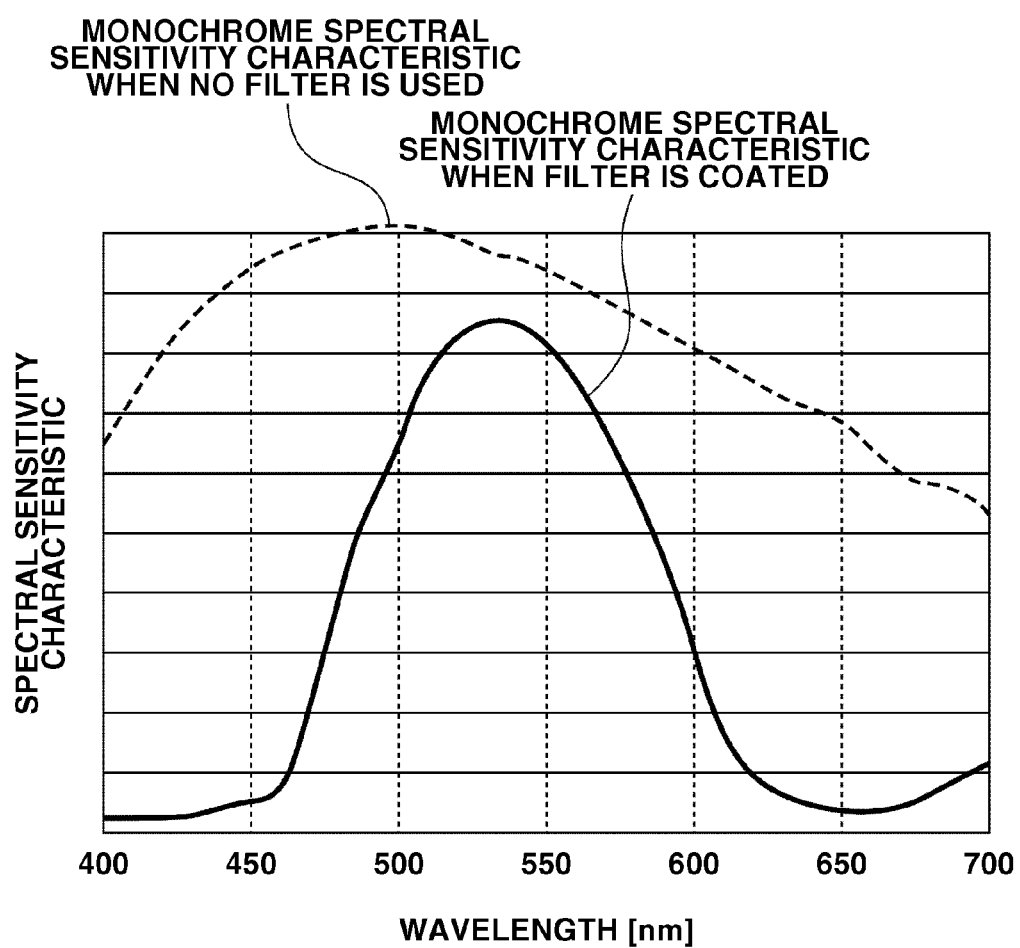
FIG. 20 is a graph illustrating the spectral sensitivity characteristic of the CCD coated with the filter according to an exemplary embodiment.

In view of such a problem, in the present exemplary embodiment, a color filter 119M having the spectral transmittance characteristic which can obtain the spectral sensitivity characteristic like that illustrated in FIG. 20 is coated on the monochrome line sensor of the CCD 109. This color filter suppresses the transmission of light in the wavelengths around 450 nm, which is the peak wavelength of the white LED that uses a blue LED and a yellow light-emitting fluorescent material. Consequently, this color filter has a spectral transmittance characteristic that allows light having a wavelength of around 540 nm to be transmitted.

By coating this color filter 119M on the monochrome line sensor 109M, the combined spectral characteristics when a document illuminated by the white LED is read by the monochrome line sensor can be approximated to the standard visibility characteristics under the D65 light source illustrated in FIG. 17.

Figure 21:
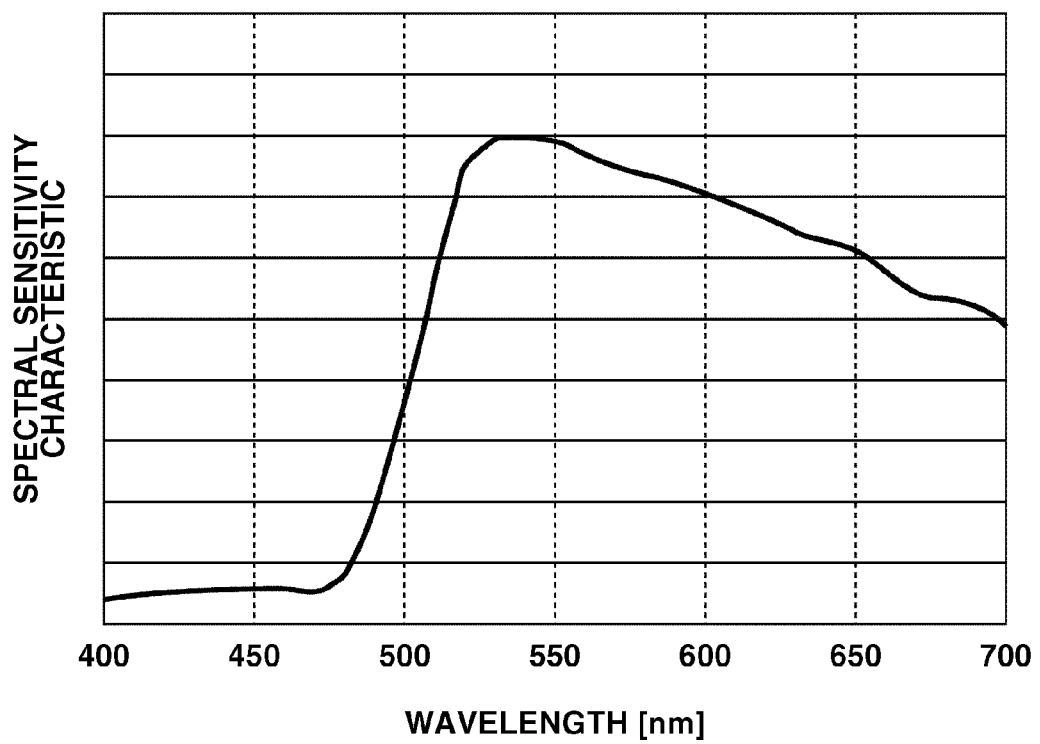
FIG. 21 is a graph illustrating the spectral sensitivity characteristic of the CCD coated with another filter according to an exemplary embodiment.

The spectral characteristics illustrated in FIG. 20 are merely one example. Various other spectral characteristics that can obtain similar effects are also available. For example, a color filter 119M having a spectral transmittance characteristic that can obtain the spectral sensitivity characteristic as illustrated in FIG. 21 may be coated on the monochrome line sensor of the CCD 109.

This color filter also suppresses the transmission of light in the wavelengths around 450 nm, which is the peak wavelength of the white LED. Consequently, this color filter has a spectral transmittance characteristic that allows light having a wavelength of around 540 nm or higher to be transmitted. Thus, the combined spectral characteristics can be approximated to the visibility characteristics under the D65 light source illustrated in FIG. 17.

Figure 22:
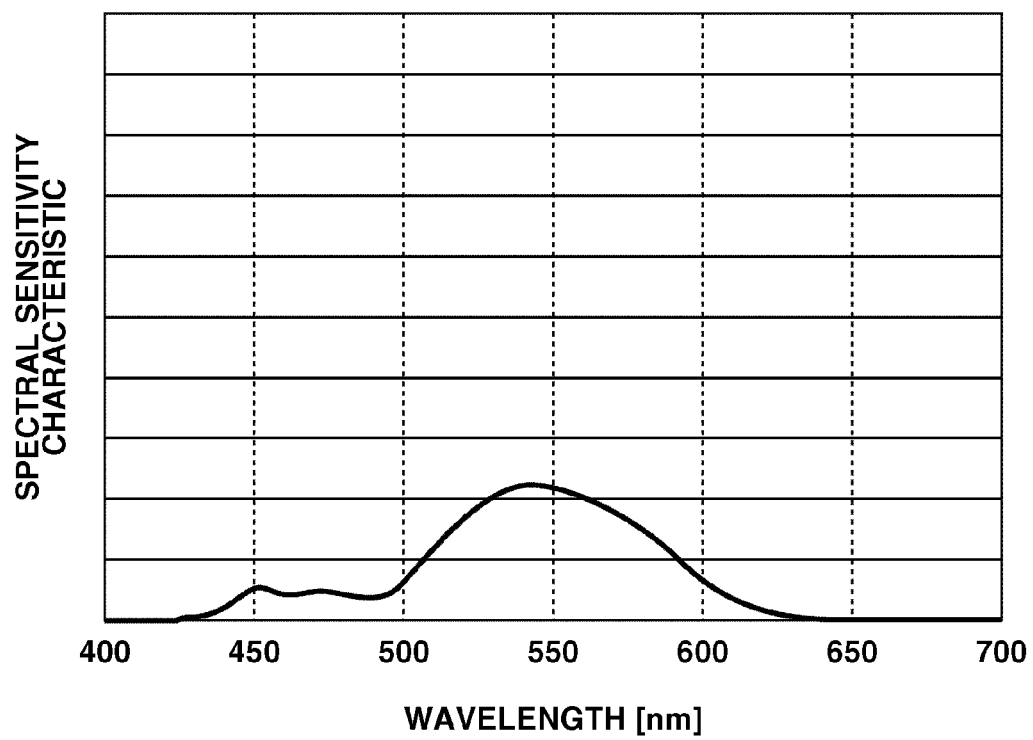
FIG. 22 is a graph illustrating the combined spectral characteristics of the spectral sensitivity characteristic of the CCD coated with the filter according to an exemplary embodiment and the spectral characteristics of a white LED.

FIG. 22 illustrates the combined spectral characteristics of the spectral characteristics of the monochrome line sensor of the CCD 109 and the white LED 104 when the color filter illustrated in FIG. 20 is coated on the CCD 109. As illustrated in FIG. 22, the transmission of light at a predetermined wavelength (around 450 nm), which is the peak wavelength of the white LED (i.e., peak wavelength of the blue LED), is suppressed by the color filter.

As can be seen by a comparison with FIG. 10, which illustrates the combined spectral characteristics of a CCD that is not coated with a color filter and the white LED, the color filter suppresses the transmission of light so that the peak wavelength of the combined spectral characteristics of the CCD and the white LED becomes a longer wavelength than the peak wavelength of the white LED.

Further, as can be seen by comparing FIGS. 22 and 10 while referring to FIG. 11 that illustrates the standard relative visibility characteristics, the color filter suppresses the transmission of light so that the weighted center of the combined spectral characteristics of the white LED and the CCD moves closer to the weighed center of the standard relative visibility characteristics.

In other words, the color filter suppresses the transmission of light at the peak wavelength of the LED in the white LED so that, regarding the intensity of the light to be received on the monochrome line sensor, the intensity of the light at the peak wavelength of the LED in the white LED is smaller than the intensity of the light at the peak wavelength when the fluorescent material in the white LED receives the light from the LED in the white LED.

Figure 23:
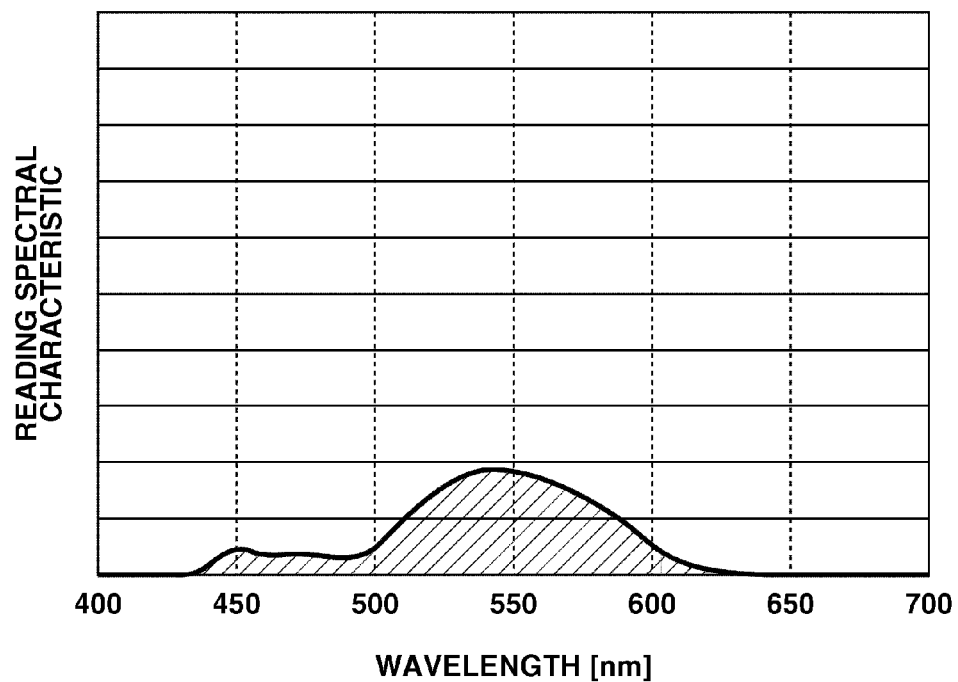
FIG. 23 is a graph illustrating the combined spectral characteristics when a white document is read by the CCD coated with the filter according to an exemplary embodiment.

When a white document like that illustrated in FIG. 15 is read by a monochrome line sensor coated with a color filter having spectral characteristic as illustrated in FIG. 20, the reading spectral characteristic is as illustrated in FIG. 23. Further, when a yellow document like that illustrated in FIG. 14 is read by a monochrome line sensor coated with a color filter having spectral characteristic as illustrated in FIG. 20, the reading spectral characteristic is as illustrated in FIG. 24.

Figure 24:
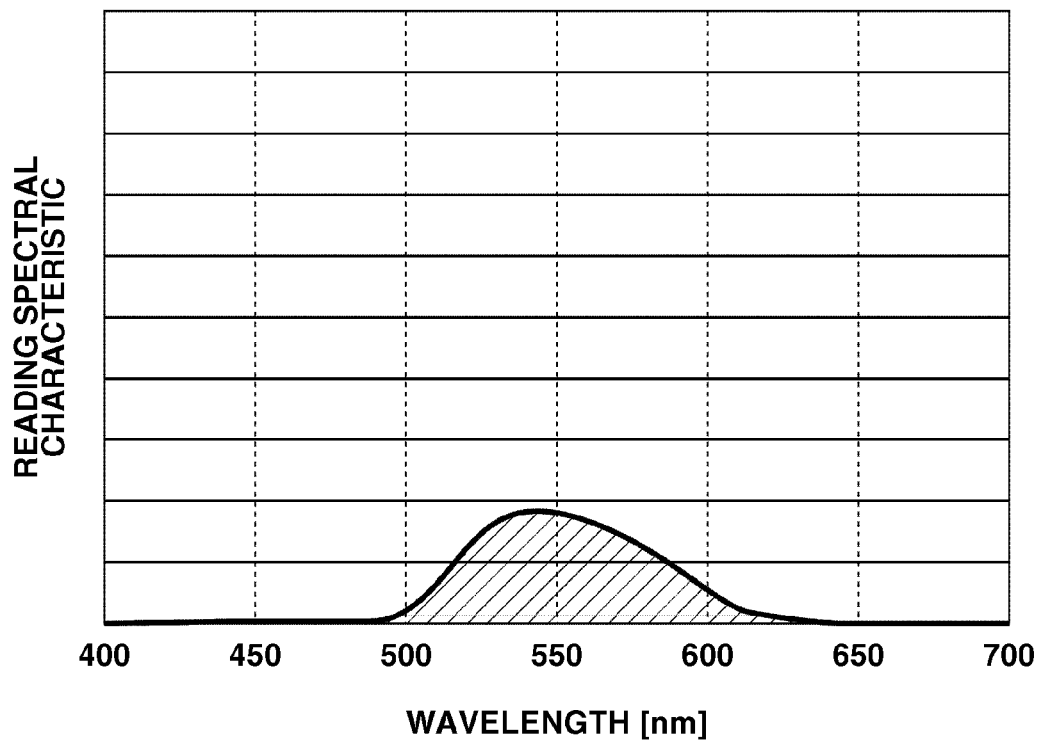
FIG. 24 is a graph illustrating the combined spectral characteristics when a yellow document is read by the CCD coated with the filter according to an exemplary embodiment.

If the surface area of the hatched portion in FIG. 23 is considered as 1, the surface area of the hatched portion in FIG. 24 is 0.82. As described above, this means that if the intensity when a person views a white document under the D65 light source is considered as 1, the intensity when the person views a yellow document under the D65 light source will be 0.87.

Thus, by using a filter which suppress the transmission of light (light at the peak wavelength of the blue LED) having a predetermined wavelength from among the light irradiated by the white LED, reading close to the visibility characteristics of a person can be performed even if the document is illuminated by a white LED that includes a blue LED and a yellow light-emitting fluorescent material. Therefore, the problem in which the document and the reading image output look different can be prevented.

The color filters having the spectral characteristics illustrated in FIGS. 20 and 21 will now be described in detail. The spectral characteristic in FIG. 20 is realized by coating the same material as the color filter used for the green sensor of the CCD 109 illustrated in FIG. 8 more thinly than that for the green sensor. Using the same color filter material as the green sensor allows the process of coating the color filter on the respective line sensors of the CCD 109 to be simplified, and production costs to be reduced.

Further, the reason for thinly coating the color filter on the monochrome line sensor is to increase the amount of received light compared with the amount of received light of the color line sensors. Thereby, as described above, the document can be read at higher speed during monochrome reading.

Supposing that the color filter is coated on the monochrome line sensor in the same thickness as the green sensor, unless the light amount of the light source is increased, if the document is read in the monochrome mode at a faster speed than in the color mode, the amount of received light of the monochrome line sensor will decrease. Although the decreased amount of received light can be supplemented by amplifying the output signal of the CCD 109, since this will also amplify the noise component in the output signal of the CCD 109 during amplification, the SN ratio of the image will deteriorate.

To avoid such problems, a color filter formed from the same material used for the green sensor of the CCD 109 is thinly coated. By thinly coating the same material as the color filter used for the green sensor of the CCD 109, the transmission of light at the peak wavelength of the blue LED around 450 nm is suppressed, and light having a wavelength of around 540 nm is transmitted.

On the other hand, to obtain the spectral characteristic in FIG. 21, a color filter material different from the color filter material of the green sensor is coated. Therefore, while the number of color filter coating processes increases, the spectral transmittance of 600 nm or more is higher. Consequently, the amount of received light on the monochrome line sensor can be increased, and the SN ratio can be improved.

In the first exemplary embodiment, a color-readable document reading apparatus has been described. In a second exemplary embodiment, a document reading apparatus that can only read monochrome will be described.

Since this is an apparatus specializing in monochrome reading, the light source does not have to be white. However, to reduce development costs and production costs, the same white LED as the light source for the color-readable document reading apparatus may be used. Similar to the first exemplary embodiment, if a white LED using a blue LED and a yellow light-emitting fluorescent material is used as the light source, the problems described above occur.

Figure 25:
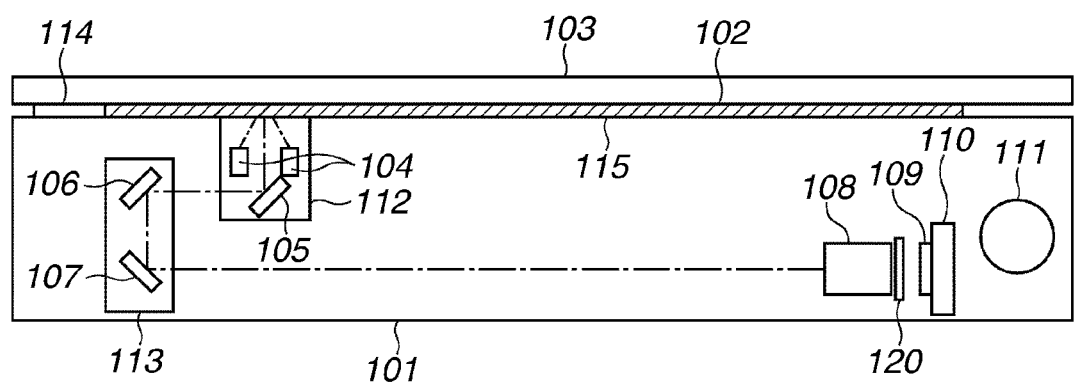
FIG. 25 illustrates a configuration of a document reading apparatus according to another exemplary embodiment of the present invention.

Therefore, in the second exemplary embodiment, as illustrated in FIG. 25, a filter glass 120 coated with a filter having the spectral transmittance characteristic illustrated in FIG. 20 or FIG. 21 is arranged apart from the CCD 109 on an optical path between the CCD 109 having only a monochrome line sensor and the document.

By providing the filter glass 120 instead of coating a filter on the CCD 109, in addition to obtaining similar effects to those of the first exemplary embodiment, the following effects can also be obtained.

Since minute dust and the like can not be allowed to adhere to the reading pixels of the CCD 109, the process for coating the color filter on the CCD 109 may be carried out in a clean room.

This process for coating the color filter in a clean room may increase in costs. Further, to completely eliminate the adhesion of dust is difficult even in the clean room. This may cause problems with the production yield due to the adherence of dust. The CCD 109 is formed from pixels 10×10 μm in size. Thus, in the process for coating the color filter on the CCD 109, the dust amount per 100 μm² is important.

In the present exemplary embodiment, the filter glass 120 is arranged between the lens 108 and the CCD 109. In this case, the light beam from the lens 108 diverges the further the position of the filter glass 120 is away from the CCD 109 and the closer it is to the lens 108.

In this case, for example, one pixel corresponds approximately to 500 μm×500 μm=250,000 μm². Therefore, even if dust adheres to the filter glass 120 when coating, the dust may have an influence on a pixel having an area corresponding to 250,000 μm². Consequently, the influence thereof can be suppressed.

This means that minute dust can be allowed. Therefore, the problem in which the document and the reading image output look different can be prevented while allowing the filter glass 120 to be produced at a lower production cost.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-020238 filed Jan. 30, 2009, which is hereby incorporated by reference herein in its entirety.

What is claimed is:

1. A document reading apparatus comprising:
a white light-emitting diode including a light-emitting diode and a fluorescent material and configured to illuminate a document at a document reading position; and
a reading unit having a color line sensor with a first filter and a monochrome line sensor with a second filter and configured to read an image of the document illuminated by the white light-emitting diode,
wherein there is a first optical path between the white light-emitting diode and the document reading position, a second optical path between the color line sensor and the document reading position, and a third optical path between the monochrome sensor and the document reading position,
wherein the first filter is arranged on the second optical path,
wherein the second filter is arranged on the third optical path, and
wherein the second filter is configured to suppress transmission of light at a peak wavelength of the light-emitting diode so that, regarding an intensity of light to be received on the monochrome line sensor, the intensity of the light at the peak wavelength of the light-emitting diode is smaller than the intensity of a light at the peak wavelength of the fluorescent material.

2. The document reading apparatus according to claim 1, wherein the color line sensor includes red, green and blue color line sensors, and
wherein the second filter is coated with a coating material of a green filter coated on the green color line sensor, and the coating material is coated thinner than that coated for the green filter.

3. The document reading apparatus according to claim 1, wherein the light-emitting diode is a blue light-emitting diode and the fluorescent material is a yellow light-emitting fluorescent material.

4. The document reading apparatus according to claim 3, wherein the second filter is configured to suppress transmission of light at a peak wavelength of the blue light-emitting diode.

5. The document reading apparatus according to claim 1, wherein the color line sensor includes three line sensors, and
wherein red, green, and blue color filters are respectively coated on the three line sensors of the color line sensor.

6. The document reading apparatus according to claim 1, wherein the second filter is provided on the monochrome line sensor.

7. The document reading apparatus according to claim 1, wherein the second filter is provided adjacent to the monochrome line sensor.

8. The document reading apparatus according to claim 1, further comprising a platen on which the document is placed, wherein the monochrome line sensor is placed at the same side as the color line sensor with respect to the platen.

9. The document reading apparatus according to claim 1, wherein an amount of light received by the second sensor through the second filter is larger than an amount of light received by one of the color line sensor comprising a plurality of color sensors, through the first filter.

10. The document reading apparatus according to claim 9, wherein the one of the color line sensor is designed to receive the light through a green color filter portion.

11. The document reading apparatus according to claim 1, wherein the second filter comprises a green color filter.

12. The document reading apparatus according to claim 11, wherein the first filter comprises a green color filter portion, and wherein a thickness of the color filter of the second filter is thinner than a thickness of the green color filter portion of the first filter.

13. The document reading apparatus according to claim 1, further comprising an optical carriage containing the white light-emitting diode, wherein the document reading position is moved according to movement of the optical carriage.

14. A document reading apparatus comprising:
a white light-emitting diode including a light-emitting diode and a fluorescent material and configured to illuminate a document at a document reading position;
a color reading unit having a first sensor and a first filter and configured to read the document illuminated by the white light-emitting diode for outputting color data;

a monochrome reading unit having a second sensor and a second filter and configured to read the document illuminated by the white light-emitting diode for outputting monochrome data, wherein there is a first optical path between the white light-emitting diode and the document reading position, a second optical path between the first sensor and the document reading position, and a third optical path between the second sensor and the document reading position, wherein the first filter is arranged on the second optical path, wherein the second filter is arranged on the third optical path, and wherein a peak value of spectral transmission of the second filter is lower in a blue range than in a green range.

15. The document reading apparatus according to claim 14, wherein the first filter includes red, green and blue color filters, and the first sensor includes red, green and blue color line sensors coated with the red, green and blue color filters, respectively, and wherein the second sensor is a monochrome line sensor coated with the second filter.

16. The document reading apparatus according to claim 15, wherein red, green and blue data generated by the red, green and blue color line sensors, respectively, is each output from a different output terminals, and wherein first and second monochrome data generated by the monochrome line sensor and corresponding to different pixels is each output from a different output terminal.

17. The document reading apparatus according to claim 15, wherein an amount of light received on the second sensor coated with the second filter is larger than an amount of light received on the green color sensor coated with the green color filter.

18. The document reading apparatus according to claim 17, wherein the second filter is the green color filter being thinned.

19. The document reading apparatus according to claim 14, wherein the second filter suppresses transmission of light in the blue range and transmits light having a wavelength in the green range and in a range higher than the green range.

20. The document reading apparatus according to claim 14, wherein the light-emitting diode is a blue light-emitting diode and the fluorescent material is a yellow light-emitting fluorescent material.

21. The document reading apparatus according to claim 14, wherein the second filter is provided on the monochrome line sensor.

22. The document reading apparatus according to claim 14, wherein the second filter is provided adjacent to the monochrome line sensor.

23. The document reading apparatus according to claim 14, further comprising a platen on which the document is placed, wherein the monochrome line sensor is placed at the same side as the color line sensor with respect to the platen.

24. The document reading apparatus according to claim 14, wherein an amount of light received by the second sensor through the second filter is larger than an amount of light received by one of the color line sensor, comprising a plurality of color sensors through the first filter.

25. The document reading apparatus according to claim 24, wherein the one of the color line sensor is designed to receive the light through a green color filter portion.

26. The document reading apparatus according to claim 14, wherein the second filter comprises a green color filter.

27. The document reading apparatus according to claim 26, wherein the first filter comprises a green color filter portion, and wherein a thickness of the green color filter of the second filter is thinner than a thickness of the green color filter portion of the first filter.

28. The document reading apparatus according to claim 14, further comprising an optical carriage containing the white light-emitting diode, wherein the document reading position is moved according to movement of the optical carriage.

29. A document reading apparatus comprising:

a white light-emitting diode including a light-emitting diode and a fluorescent material and configured to illuminate a document at a document reading position;

a color reading unit having a first sensor and a first filter and configured to read the document illuminated by the white light-emitting diode for outputting color data;

a monochrome reading unit having a second sensor and a second filter and configured to read the document illuminated by the white light-emitting diode for outputting monochrome data, wherein there are a first optical path between the white light-emitting diode and the document reading position, a second optical path between the first sensor and the document reading position, and a third optical path between the second sensor and the document reading position, wherein the first filter is arranged on the second optical path, wherein the second filter is arranged on the third optical path, and wherein a value of spectral transmission of the second filter at a wavelength of 450 nm is lower than a value of spectral transmission of the second filter at a wavelength of 540 nm.

30. The document reading apparatus according to claim 29, wherein the first filter includes red, green and blue color filters, and the first sensor includes red, green and blue color line sensors coated with the red, green and blue color filters, respectively, and wherein the second sensor is a monochrome line sensor coated with the second filter.

31. The document reading apparatus according to claim 30, wherein red, green and blue data generated by the red, green and blue color line sensors, respectively, is each output from a different output terminals, and wherein first and second monochrome data generated by the monochrome line sensor and corresponding to different pixels is each output from a different output terminal.

32. The document reading apparatus according to claim 31, wherein the second filter is the green color filter being thinned.

* * * * *